WILSON, WALKER & FOSTER.
Clipping Shears.
No. 84,926. Patented Dec. 15, 1868.
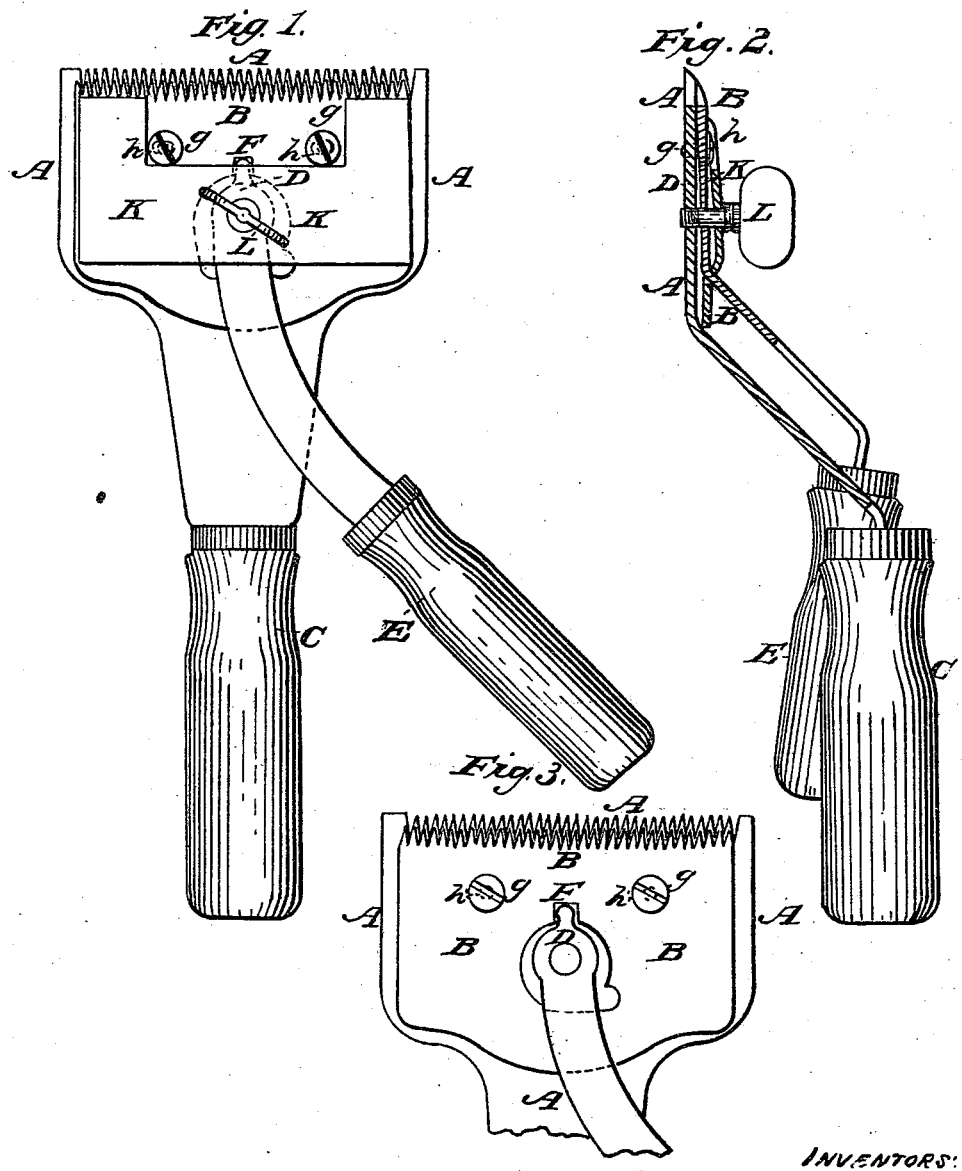
WITNESSES:
N. O'Neill
Arthur B. Williams
INVENTORS:
John C. Wilson
Adam Walker
John Foster

United States Patent Office.

JOHN C. WILSON, ADAM WALKER, AND JOHN FOSTER, OF NEW YORK, N. Y.

Letters Patent No. 84,926, dated December 15, 1868.

IMPROVEMENT IN CLIPPING-SHEARS.

The Schedule referred to in these Letters Patent and making part of the same.

*To all whom it may concern:*

Be it known that we, JOHN C. WILSON, ADAM WALKER, and JOHN FOSTER, all of the city, county, and State of New York, have invented a new and useful Improvement in Clippers for clipping or shearing the hair of horses and other animals; and do hereby declare that the following is a general description thereof, reference being had to the accompanying drawings, making part of this specification, of which—

Figure 1 is a plan view of a horse-clipper, representing our improvement;

Figure 2, a vertical section of same; and

Figure 3, a plan view of clipper, with spring-plate and adjusting thumb set-screw removed.

The nature of this invention consists in the application of a spring-plate and thumb set-screw to the serrated cutters of a horse-clipper, for the purpose of adjusting and holding the said cutters steadily in position, in relation to each other, by means of which an even clip, leaving a smooth surface, is obtained at all times, which is not the case when the serrated cutters are used without our improvement; for they have been found from experience to work loose and spread apart, while the dirt and dandruff of the animal's skin found their way between the serrated cutters, deranging their movements, the results being a bad clip, leaving a ridgy and uneven surface.

In the drawings—

A and B indicate the serrated cutters, the lower cutter, A, being stationary, and attached to a handle, C, while the upper serrated cutter, B, slides on the cutter A, its movements back and forth being caused by a cam, D, attached to the handle E of the clipper, which works in a corresponding slot, F, in the cutter B, the extent of movement of the cutter B being regulated by the screws $g\ g$ in the cutter A, and slots $h\ h$ in the cutter B.

K is the spring-plate, which is stationary, and rests on the cutter B, and between which and the stationary cutter A the cutter B slides freely; and L is the adjusting thumb set-screw, by means of which and the spring-plate K, the serrated cutters are adjusted, braced together, and held in position, during the operation of clipping a horse or other animal.

We are aware that an English patent has been granted for a clipper for clipping horses; but the same, in the absence of our improvement, has been found inoperative. We, therefore do not claim such; but What we do claim as new, and desire to secure by Letters Patent, is—

The spring-plate K, and adjusting thumb set-screw L, in combination with the serrated cutters A B, substantially as and for the purposes described and set forth.

In testimony whereof, we have hereunto set our signatures, this 14th day of November, A. D. 1868.

JOHN C. WILSON.
ADAM WALKER.
JOHN FOSTER.

Witnesses:
A. NEILL,
ARTHUR B. WILLIAMS.